United States Patent [19]

Pappas

[11] 4,123,161

[45] Oct. 31, 1978

[54] APPARATUS FOR AND METHOD OF EXAMINING LIGHT

[76] Inventor: George J. Pappas, 866 Croton Rd., Wayne, Pa. 19087

[21] Appl. No.: 788,578

[22] Filed: Apr. 18, 1977

Related U.S. Application Data

[63] Continuation of Ser. No. 480,565, Jun. 18, 1974, abandoned, which is a continuation of Ser. No. 262,463, Jun. 14, 1972, abandoned.

[51] Int. Cl.$^2$ .................................................. G01J 3/12

[52] U.S. Cl. ....................................... 356/99; 356/100; 356/101

[58] Field of Search ....................... 356/99, 100, 98, 74

[56] References Cited

U.S. PATENT DOCUMENTS

| | | | |
|---|---|---|---|
| 2,813,451 | 11/1957 | Stickney | 356/100 |
| 3,432,238 | 3/1969 | Girard | 356/99 |
| 3,521,960 | 7/1970 | Newcomer | 356/101 |

*Primary Examiner*—Vincent P. McGraw
*Attorney, Agent, or Firm*—Woodcock, Washburn, Kurtz & Mackiewicz

[57] ABSTRACT

Light is examined utilizing a wide slit and a dispersion means such as a prism to produce two pairs of diverging beams separated by an intermediate converging beam of white light. The light emerging from the dispersion means impinges upon a narrow slit situated between the dispersion means and a point at which the intermediate beam of white light converges. In a monochrometer, the first pair of diverging beams comprise red and yellow rays and emanate from one side of the dispersion means and the second pair of diverging beams comprises blue and violet rays and emanate from the other side of the dispersion means. A narrow slit located between the dispersion means and a point at which the intermediate white beam converges passes rays of a single color, either red, yellow, blue or violet, to a second dispersion means and light emerging from the second dispersion means impinges upon a means for measuring the dispersion of rays passing through the narrow slit with respect to a reference point. In the spectrometer, a narrow slit having a sufficient width to pass red and yellow rays while blocking blue and violet rays and vice versa is located between a dispersion means and a measuring means. The measured displacement of the rays provides a signature for the source of light illuminating the wide slit.

7 Claims, 4 Drawing Figures

APPARATUS FOR AND METHOD OF EXAMINING LIGHT

This is a continuation of application Ser. No. 480,565, filed June 18, 1974 and now abandoned, which is a continuation of application Ser. No. 262,463, filed June 14, 1972 and now abandoned.

BACKGROUND OF THE INVENTION

1. Field of the Invention

This invention relates to examination of light in general as well as the examination of the spectral frequencies associated with various colors in the visible spectrum.

The serious study of colors began with the works of Newton who conducted most of his experiments with a narrow slit illuminated by sun light in combination with prisms and lenses. The resulting formation of the so-called natural spectrum of colors ranging from red through violet as found in the formation of rainbows was accepted as the starting point for the study of color. As far as Newton was concerned, there were seven colors which could be seen by the human eye and all seven colors could be reconverged to form natural light.

Subsequently, the investigation into color theory took a new turn when it was discovered that all colors in the visible spectrum could be derived from a certain few colors, i.e., red, yellow and blues. This led subsequent investigators to inquire as to what spectrally might be considered primary or fundamental. The work of these investigators is summarized in *Principles of Physical Optics,* Mach, Ernest, Dover, 1926, pp. 103 and more recently in *Color—A Survey in Words and Pictures,* Birren, Faber, University Press, 1963.

In general, the direction for modern theories was given by Thomas Young who assumed that the color response of the human eye was arbitrarily limited by two extremes at each end of the spectrum; i.e., red and violet, and that the mid section or green could be used as a minimum factor from which all other colors including white could be obtained, where white itself was assumed to be a combination of all three colors. Without further reviewing all of the arguments by the many investigators on the subject of what constitutes primary colors, it is sufficient to state that the three component theory of Young as modified by Helmholtz and experimentally corroborated by Maxwell, is accepted as the basis for a primary system consisting of red, green and blue. Added and superimposed upon this basic concept are the works of subsequent investigators in colorimetry who have added white and black as fundamental factors. However, mention should be made of further investigators who have taken the position that the human eye does not need to accept any combination of colors as primary since it may be demonstrated that any combination of opposite or complementary colors plus a third which may be derived from these two plus white will give a complete gamut of colors.

2. Prior Art

It will therefore be seen that many authorities have offered different theories of color and reasons why certain colors are to be considered primary or fundamental. However, few have challenged the method and procedures for examining colors in the visible spectrum as first proposed by Newton, that is, the use of a narrow slit in combination with diffraction means such as a grating or a dispersion means such as a prism.

One of the few investigators to challenge the basic tenets of color science was August Kirschmann. In a paper presented in 1917, Das Umgekehrte Spektrum Seine Komplementarverhaltnisse, *Physikalisch Z.* 18.195, Kirschmann indicated that color science would have developed quite differently if a small obstacle had replaced Newton's slit since the use of such an obstacle in combination with a prism will produce an inverted spectrum.

According to Ernest Mach, Helmholtz did utilize a wide slit in his efforts to disprove the red, yellow and blue primary color theory of David Brewster. Helmholtz contended that yellow and blue were the primary colors and that the white light formed between the spectral pairs utilizing a wide slit was white light comprising yellow and blue light.

In general, however, the narrow slit has been accepted as fundamental to the study of colors. The use of the narrow slit in present day spectral analysis equipment is well documented in the patent prior art. For example, U.S. Pat. No. 3,247,758 — Turner discloses the use of narrow slits in a dual monochrometer system.

SUMMARY OF THE INVENTION

It is a general object of this invention to examine the nature of light.

In accordance with this object of the invention, a wide slit is illuminated by a source of light. After the light emerges from the slit it is passed through a dispersion means such as a prism. After the light passes the dispersion means, it is separated into a first pair of divergent beams and a second pair of divergent beams separated by an intermediate beam of white light which converges to a point. Light of longer wavelengths emanates as rays in the first pair of beams and the light of shorter wavelengths emanates as rays in the second pair of beams. A narrow slit is then provided for separating the rays of longer wavelengths and the rays of shorter wavelengths. The slit is situated between the dispersion means and the point to which the intermediate beam of white light converges. Finally, means are provided for measuring the dispersion of the rays of different wavelengths with respect to a reference point.

It is a more specific object of this invention to examine the primary colors which exist in a visible spectrum.

It is a still more specific object of this invention to examine the primary colors of red, yellow, blue and violet which exist in the visible spectrum.

In accordance with these specified objects, the invention may be embodied in a monochrometer comprising a source of white light and a means including a wide slit illuminated by the source. The white light emanating from the slit is separated into rays of primary colors by a dispersion means, red and yellow rays emanating from one side of the dispersion means while blue and violet rays are emanating from the other side thereof. As the rays leave the dispersion means, there is a substantial spacing between the red and yellow rays and the blue and violet rays. A narrow slit in the path of the rays passes rays of only one primary color while blocking rays of the other primary colors. The rays passing through the narrow slit are then passed through a second dispersion means to a means for measuring the diffraction of the rays relative to a reference point.

Also, in accordance with these specific objects,the invention may be embodied in a spectrometer comprising a source of light. A means including a wide slit illuminated by the source and a first dispersion means are provided. Light emerging from the first dispersion means is separated into a first pair and a second pair of divergent beams separated by an intermediate beam of white light which converges to a point. Red and yellow rays are found in the second pair of beams and blue and violet rays are found in the second pair of beams. Selected rays are passed through a narrow slit situated between the first dispersion means and the point to which the intermediate beam converges. The slit is sufficiently narrow so as to simultaneously block rays at one end of the visible spectrum, for example blue and violet rays, while passing all rays at the other end of the spectrum, for example, red and yellow rays. Means are provided beyond the narrow slit for measuring dispersion of the rays relative to a reference point.

DETAILED DESCRIPTION OF THE INVENTION

Before proceeding with a detailed description of a preferred embodiment of the invention, several experimentally observable color phenomena will be discussed with reference to FIG. 1. As shown there, a source of white light 10 illuminates a wide slit 12 and an opaque object 14 to create a plurality of rays **16*a* and 16*b* emanating from between the edges 18*a* and 18*b* of the slit 12. These rays 16*a* and 16*b* are then introduced into a conventional 60° prism 20** to produce a pattern of rays.

Figure 1:
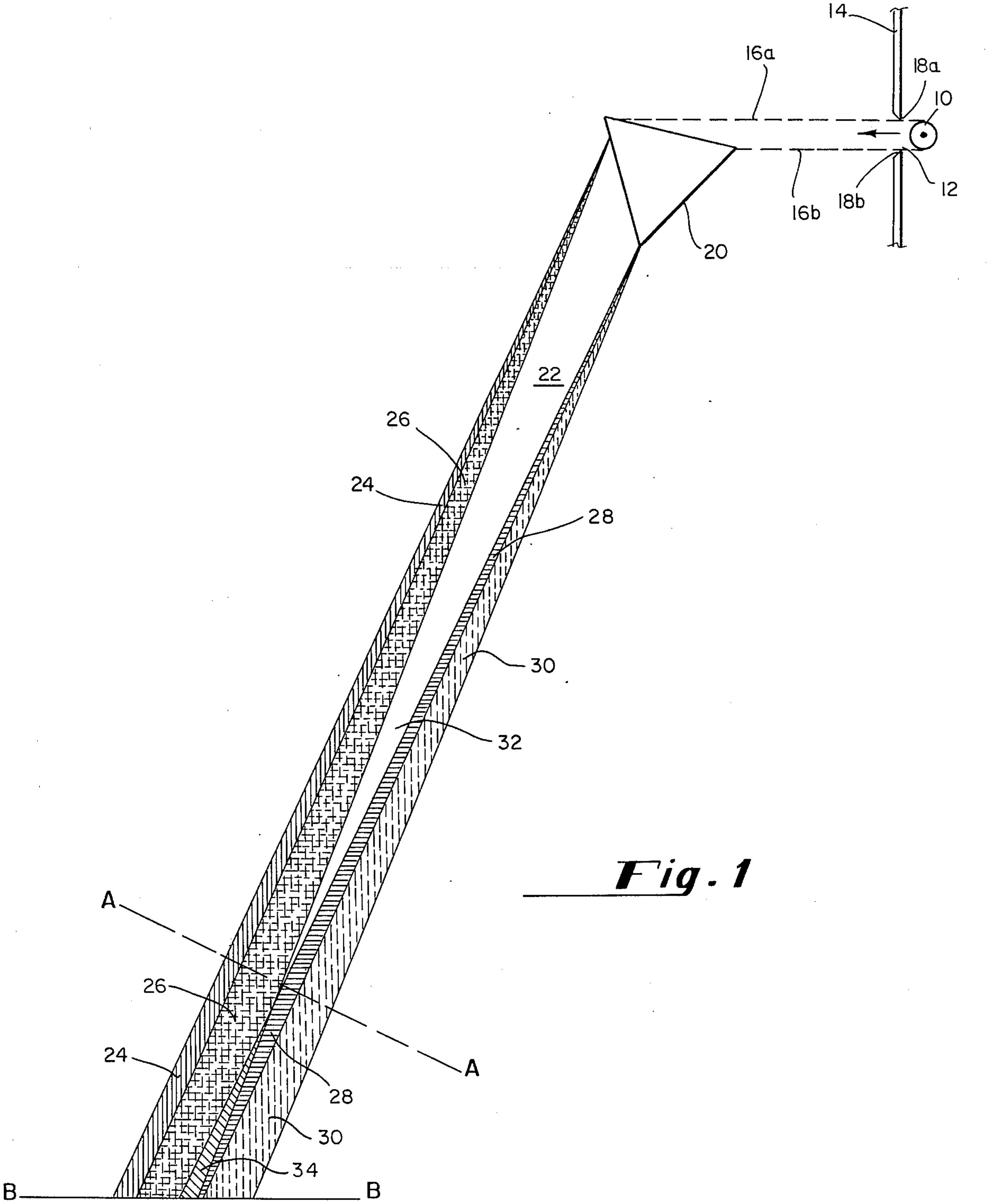
FIG. 1 is a schematic diagram illustrating the conventional overlap between the blue and yellow rays which results when a slit is utilized to examine the visible spectrum.

When the rays of FIG. 1 are examined, it is found that the rays leaving the prism 20 consist of a first and a second pair of diverging beams separated by an intermediate beam of white light which converges to a point at the line A—A: red rays 24, and yellow rays 26 are found in the first pair of beams, and, blue rays 28 and violet rays 30. Note that throughout the entire distance between the prism 20 and the line A—A, the yellow rays 26 remain separate from the blue rays 28 by a converging beam of white light 32 which tapers from a rather substantial width at the prism 20 to a point at the line A—A.

Beyond line A—A, the yellow rays 26 may crossover or overlap with the blue rays 28 in an area designated with the reference character 34. If one is standing at line B—B, one will now observe not only the colors red, yellow, blue and violet but also the color green in the area 34. Thus, while there were only four colors, i.e., red, yellow, blue and violet at the line A—A, there are now at least four colors plus green at the line B—B.

It will therefore be observed that the color green is only existent where there is cross-over or overlap between blue and yellow rays of light. This has led me to believe that there is no primary or fundamental spectral frequency corresponding to the color green. Rather, the color green is merely a sensation produced by the human eye when overlapping blue and yellow rays are incident upon the human eye. In other words, there are discrete spectral frequencies corresponding to the colors red, yellow, blue and violet but there is no discrete spectral frequency corresponding to the color green.

Figure 2:
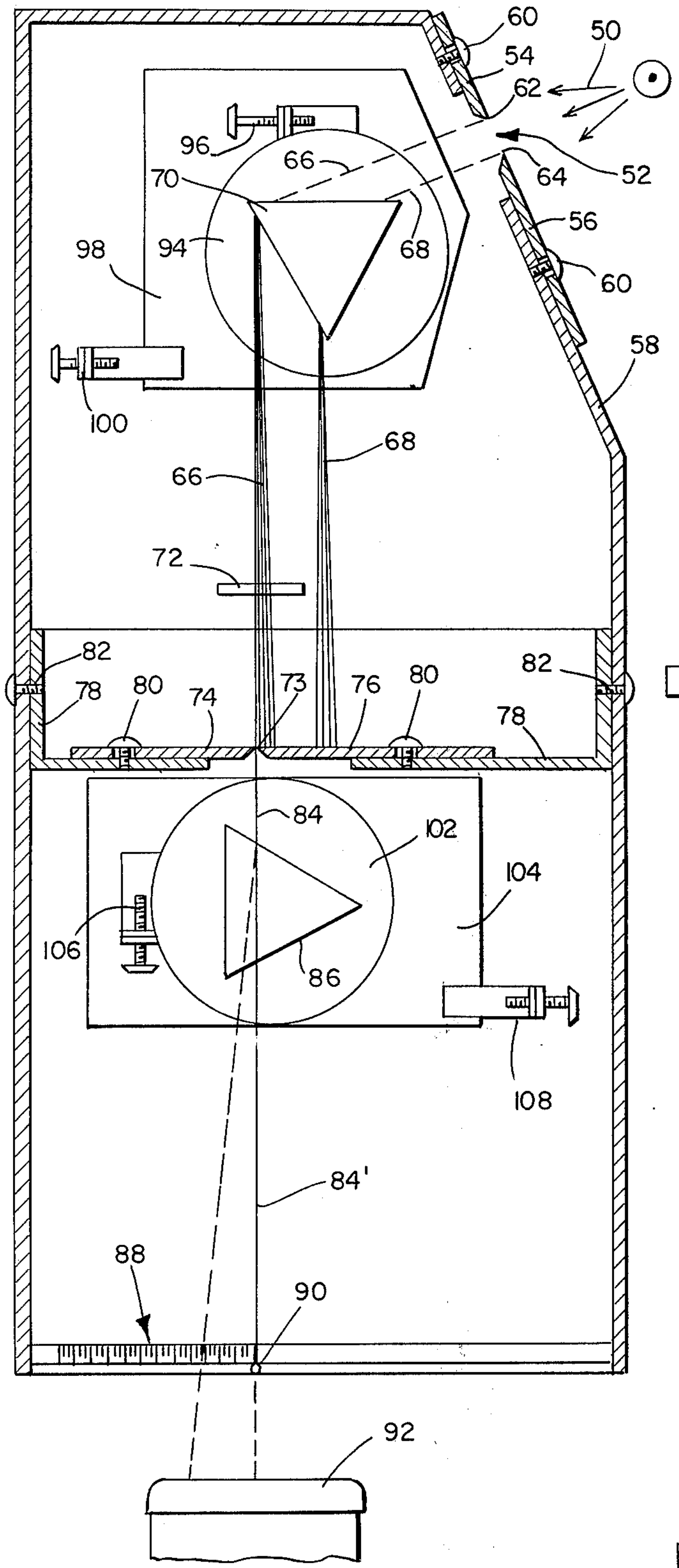
FIG. 2 is a sectional view of a monochrometer embodying the invention.

It has been found that when a wide slit rather than a narrow slit is employed, crossover is minimized. Accordingly, a monochrometer constructed in accordance with the invention and utilizing a wide slit will now be described with reference to FIG. 2. A source of white light 50 illuminates a wide slit 52 formed by opaque baffles 54 and 56 which are secured to the monochrometer housing 58 by screws 60. The white light passing over the slit 52 is then introduced into a first dispersion means or prism 70 which separates the light into pairs of beams 66 and 68. The beams 66 comprise red and yellow rays. The beams 68 comprise blue and violet rays. Individual rays of the beams 66 and 68 are then passed through a collimating lens 72 to a narrow slit 73 provided by baffles 74 and 76 which are secured to a platform 78 by screws 80. The platform 78 is in turn secured to the housing 58 by screws 82. The baffles 74 and 76 are situated a distance from the dispersion means 70 which is less than the distance between dispersion means and the point at which the intermediate white beam between the beams 66 and 68 converges.

By providing the narrow slit 73 as formed by the baffles 74 and 76, which slit has a sufficiently narrow width so as to pass rays of a single color in the beams 66 and 68, individual color rays may be examined by passing the individual rays 84 through a second dispersion means comprising a prism 86. The dispersion produced by the prism 86 may then be measured along a scale 88 or a telescopic sight 92 at the base of the housing 58, the dispersion being measured with respect to a reference point 90 or the cross-hairs of the sight 92. The reference point may be established by passing the ray 84 being examined over the top of or beneath the bottom of the prism 86 and marking the point which the undiffracted ray 84' strikes the scale 88 or adjusting the telescopic sight 92 until the cross-hairs are aligned with the undiffracted ray 84'.

In order to pass rays of different spectral frequencies through the slit 73, the prism 70 is mounted on a rotatable platform 94 having an angular position controlled and adjusted by a vernier element 96. Similarly, the rotatable platform 94 is mounted on a carriage 98 capable of different positions which may be adjusted by a vernier element 100. It will be apparent that rotation of the platform 94 or linear movement of the carriage 98 will result in alignment of rays such that different spectral frequencies will be aligned with the narrow lens 72 and the slit 73.

A similar rotatable platform 102 and a similar carriage 104 are provided for the prism 86 permitting calibration of the monochrometer with vernier elements 106 and 108 respectively.

It will be understood that the previously described monochrometer which utilizes a wide slit maintains separation between the spectral frequencies characteristic of red and yellow light and the spectral frequencies characteristic of blue and violet light. By doing so, it is believed that monochrometer produces and permits examination of the primary or fundamental spectral frequencies, i.e., red, yellow, blue and violet.

Figure 3A:
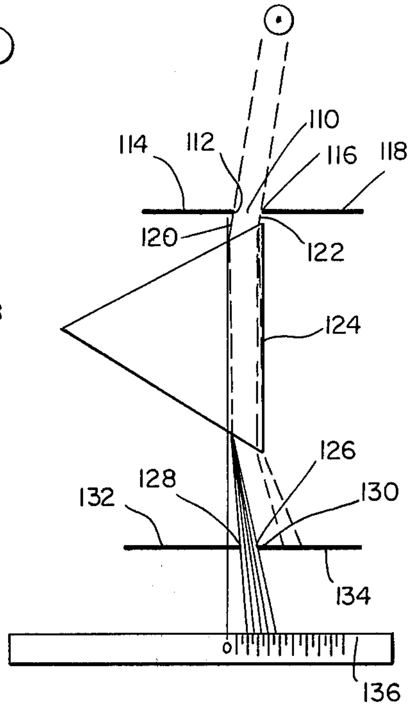
FIGS. 3*a* and 3*b* are schematic diagrams of a spectrometer embodying the invention.
Figure 3B:
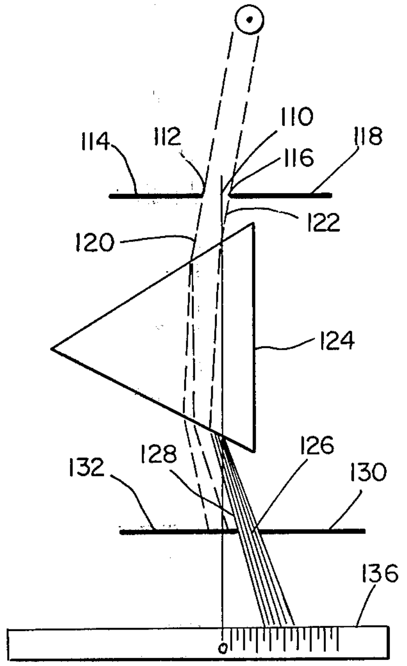

Reference will now be made to FIGS. 3*a* and 3*b* and the spectrometer disclosed therein. As in the case of the monochrometer previously described, the spectrometer comprises a wide slit 110 having one edge 112 provided by a baffle 114 and another edge 116 provided by a baffle 118. Light from a source 120 illuminates the wide slit 110. As the rays of light leave the slit 110, they are projected to a dispersion means such as a prism 124.

A narrow slit 126 formed by edges 128 and 130 of baffles 132 and 134 respectively is then utilized to pass rays at one end of the spectrum while blocking rays at the other end of the spectrum. The narrow slit is situated between the prism 124 and the point at which the aforementioned beam of white light converges. As shown in FIG. *5a*, the rays at the red and yellow end of the spectrum are passed by the slit 126 while the rays at the blue and violet end of the spectrum are blocked by the baffle 134. The dispersion of the rays by the prism 124 may then be determined by examining a scale 136 which lies in the path of the red and yellow rays as they leave the slit 126. This scale 136 has a reference point which is determined by the precise point of ray incidence at the surface of the prism 124 for the red and yellow rays as they leave the narrow slit 110.

In FIG. *3b*, the position of the prism 124 has been adjusted so as to establish the exact same point of incidence on the prism 124 for the blue and violet rays 122. As a result, the blue and violet rays pass through the slit 126 to the scale 136 while the red and yellow rays are blocked by the baffle 132.

It will therefore be understood that by utilizing the previously described spectrometer which employs a wide slit, the spectral frequencies corresponding to red, yellow, blue and violet light may be ascertained. Since it is believed that these are the primary colors, the spectral analysis of an element utilizing the spectrometer of FIGS. *3a* and *3b* should produce a more accurate signature than heretofore achieved with prior art spectrometers.

The foregoing principles and equipment have been described in terms of the visible portions of the spectrum. The principles and equipment are equally applicable to the invisible portions of the spectrum, since it can be shown that these rays behave in exactly the same manner, and for the same reasons, even if the readings must be taken through filters or photographically.

Although specific embodiments of the invention have been shown and described, various modifications may be made. For example, the diffraction elements may comprise diffraction gratings rather than the prisms shown. The claims appended hereto are intended to cover these and other modifications which will occur to those of ordinary skill in the art.

What is claimed is:

1. A system for examining light of different wavelengths comprising:
 a source of light;
 means including a wide slit illuminated by said source and a dispersion means for separating said light into a first pair of divergent beams and a second pair of divergent beams separated by an intermediate beam converging to a point, light of longer wavelengths emanating as rays in said first pair of divergent beams, light of shorter wavelengths emanating as rays in said second pair of divergent beams;
 a narrow slit situated between said dispersion means and the point at which said intermediate beam converges; and
 means for measuring the dispersion of said beams with respect to a reference point.

2. The system of claim 1 wherein said narrow slit is sufficiently wide so as to pass the pair of beams emanating from one side of said dispersion means without passing the pair of beams emanating from the other side of said dispersion means.

3. A monochrometer for examining light in the visible spectrum;
 a source of white light;
 a means including a wide slit illuminated by said source and a first dispersion means for separating said white light into two pairs of beams of primary colors emanating from opposite sides of said dispersion means, one of said pairs consisting of a red beam and a yellow beam emanating from one side of said means, the other of said pairs consisting of a blue beam and a violet beam emanating from the other side of said means, said pairs of beams being separated by an intermediate beam of white light converging to a point;
 a means including a narrow slit in the path of one of said separated pairs of beams, said slit having a sufficiently narrow width to pass rays of only one of said primary colors while blocking rays of the other of said primary colors;
 a second dispersion means for displacing primary color rays passing through said narrow slit; and
 a means for measuring the dispersion of said primary color rays passing through said narrow slit relative to a reference point representing no dispersion, the wavelengths of said primary color rays being represented by the dispersion of said primary color rays relative to said reference point.

4. The monochrometer of claim 3 including means for moving said separated pairs of beams relative to said narrow slit so as to adjustably align different primary colors rays with said narrow slit.

5. The monochrometer of claim 4 further comprising collimating means between said first dispersion means and said narrow slit.

6. A spectrometer for examining light in the visible spectrum comprising:
 means including a wide slit and a dispersion means for producing light rays of primary colors, said dispersion means producing a first pair of beams containing red and yellow rays emanating from one side of said dispersion means said dispersion means producing a second pair of beams containing blue and violet rays emanating from the other side of said dispersion means, said red and yellow rays being separated from said blue and violet rays by an intermediate beam of white light which converges to a point;
 means including a narrow slit having sufficient width for simultaneously passing all rays at one end of said spectrum while simultaneously blocking all rays at the other end of said spectrum said narrow slit being located between said dispersion means and said point; and
 means for measuring the dispersion of said rays passing through said narrow slit relative to a reference point.

7. The spectrometer of claim 6 further comprising said dispersion means being movable relative to said narrow slit to permit rays at either end of said spectrum to be aligned with said narrow slit.

* * * * *

UNITED STATES PATENT AND TRADEMARK OFFICE

CERTIFICATE OF CORRECTION

PATENT NO. : 4,123,161

DATED : October 31, 1978

INVENTOR(S) : George J. Pappas

It is certified that error appears in the above-identified patent and that said Letters Patent are hereby corrected as shown below:

Column 2, line 66, "diffraction" should read --dispersion--.

Column 3, line 7, the word "second" should read --first--.

Signed and Sealed this

*Thirteenth* Day of *January 1981*

[SEAL]

*Attest:*

SIDNEY A. DIAMOND

*Attesting Officer* *Commissioner of Patents and Trademarks*